(12) United States Patent  
Sugeno et al.

(10) Patent No.: US 7,679,655 B2  
(45) Date of Patent: Mar. 16, 2010

(54) IMAGE-DATA PROCESSING APPARATUS, IMAGE-DATA PROCESSING METHOD, AND IMAGING SYSTEM FOR FLICKER CORRECTION

(75) Inventors: Kazuhiro Sugeno, Kanagawa (JP); Koji Kamiya, Kanagawa (JP); Seiji Sato, Kanagawa (JP)

(73) Assignee: Sony Corporation (JP)

( * ) Notice: Subject to any disclaimer, the term of this patent is extended or adjusted under 35 U.S.C. 154(b) by 358 days.

(21) Appl. No.: 11/899,481

(22) Filed: Sep. 5, 2007

(65) Prior Publication Data

US 2008/0075382 A1 Mar. 27, 2008

(30) Foreign Application Priority Data

Sep. 7, 2006 (JP) .......................... P2006-242374

(51) Int. Cl.  
*H04N 9/73* (2006.01)

(52) U.S. Cl. .................................. 348/228.1

(58) Field of Classification Search ............. 348/222.1, 348/226.1, 227.1, 28.1  
See application file for complete search history.

(56) References Cited

U.S. PATENT DOCUMENTS

| 5,585,942 | A  | * | 12/1996 | Kondo ........................ 358/474 |
| 6,630,953 | B1 |   | 10/2003 | Toyoda et al. |
| 6,710,818 | B1 | * | 3/2004  | Kasahara et al. ............. 348/607 |
| 7,164,439 | B2 | * | 1/2007  | Yoshida et al. ........... 348/226.1 |
| 7,280,135 | B2 | * | 10/2007 | Kim ........................ 348/228.1 |
| 7,397,503 | B2 | * | 7/2008  | Baer et al. .............. 348/226.1 |
| 7,420,595 | B2 | * | 9/2008  | Kim et al. ............... 348/226.1 |
| 7,489,347 | B2 | * | 2/2009  | Daiku et al. ............. 348/228.1 |
| 7,502,054 | B2 | * | 3/2009  | Kalapathy et al. ........ 348/226.1 |
| 7,598,987 | B2 | * | 10/2009 | Desprez-Le Goarant et al. . 348/226.1 |

FOREIGN PATENT DOCUMENTS

| JP | 8-256294 A    | 10/1996 |
| JP | 2000-101909 A | 4/2000  |
| JP | 2001-061105 A | 3/2001  |
| JP | 2002-218319 A | 8/2002  |
| JP | 2004-241987 A | 8/2004  |

* cited by examiner

*Primary Examiner*—Jason Chan  
*Assistant Examiner*—Nicholas G Giles  
(74) *Attorney, Agent, or Firm*—Lerner, David, Littenberg, Krumholz & Mentlik, LLP

(57) ABSTRACT

An image-data processing apparatus corrects flicker in each image-data frame. The apparatus includes a threshold generator that generates a threshold; an integrator that integrates values of extracted pixel data of a selected range in each frame on the basis of the threshold; a storage unit that stores integrated values of frames; an average calculator that calculates an average value of the image data on the basis of the integrated values; a gain calculator that divides the average value by an integrated value associated with a target frame, thereby calculating a reference correction gain; a comparator that checks whether pixel data in the target frame are in the selected range; a correction-gain output unit that outputs a correction gain on the basis of the comparison; and a corrector that corrects each piece of the pixel data in the selected range on the basis of the correction gain.

8 Claims, 7 Drawing Sheets

$$\begin{cases} G & (\text{Lin} \leq \text{Lav}) \\ \dfrac{1.0-G}{\text{Lth}-\text{Lav}} \times (\text{Lth}-\text{Lin})+1.0 & (\text{Lav} < \text{Lin} < \text{Lth}) \\ 1.0 & (\text{Lth} \leq \text{Lin}) \end{cases}$$

US 7,679,655 B2

IMAGE-DATA PROCESSING APPARATUS, IMAGE-DATA PROCESSING METHOD, AND IMAGING SYSTEM FOR FLICKER CORRECTION

CROSS-REFERENCE TO RELATED APPLICATIONS

The present application claims priority from Japanese Patent Application No. JP 2006-242374, filed in the Japanese Patent Office on Sep. 7, 2006, the entire content of which is incorporated herein by reference.

BACKGROUND OF THE INVENTION

1. Field of the Invention

The present invention relates to image-data processing apparatuses, image-data processing methods, and imaging systems with which frame flicker, which occurs, for example, in high-speed imaging, is corrected. More specifically, the present invention relates to an image-data processing apparatus, an image-data processing method, and an imaging system with which a correction gain for each frame is calculated on the basis of an integrated value of the frame, obtained by integrating pixel data in a selected range having either values greater than or equal to a threshold or values less than or equal to the threshold, and the values of the pixel data in the selected range of the frame are corrected on the basis of the correction gain, so that the load of processing for determining the correction gain can be reduced, and so that flicker in an image region corresponding to the pixel data in the selected range can be corrected appropriately.

2. Description of the Related Art

The problem of flicker is considered to be significant particularly in the case of a rolling-shutter (focal-plane-shutter) imaging device. However, also in the case of a global-shutter imaging device, light tends to flicker over the entire screen, i.e., frame flicker occurs, in high-speed imaging due to the imaging rate being faster than the ON/OFF period of illumination. In some cases, the frame flicker makes it difficult to correct individual regions in the screen due to difference in the phase or level of illumination among the individual region, for example, when a plurality of light sources exists in the image on the screen.

In an existing method of flicker correction, a region where flicker has occurred is detected and correction is executed in the region. With this method, detection is to be executed as to in which region flicker has occurred. However, the status of flicker varies depending on light sources or objects, so that processing for detecting a region becomes complex and the load increases in order to achieve accurate correction.

In another existing method of flicker correction, a correction gain is determined on the basis of an average value and an integrated value of a frame. With this method, if regions of different flicker states (e.g., regions where flicker has occurred and regions where flicker has not occurred) exist in the screen, when correction is executed in the regions where flicker has occurred, conversely, flicker newly occurs in the regions where flicker had not occurred.

In a first example of flicker correction, shown in FIG. 8, a rectangular parallelepiped occupies a large ratio among components in a frame. Thus, when flicker components of the rectangular parallelepiped are corrected, flicker components occur in a background due to the correction gain. Conversely, in a second example of flicker correction, shown in FIG. 9, a background occupies a large ratio among components in a frame. Thus, when flicker components of the background are corrected, flicker components occur in a rectangular parallelepiped due to the correction gain.

According to techniques proposed in Japanese Unexamined Patent Application Publication No. 2000-101909, a screen is divided into regions, flicker correction gains are calculated for the individual divided regions, and flicker correction is executed in the divided regions independently using their individual flicker correction gains.

SUMMARY OF THE INVENTION

According to the techniques described in Japanese Unexamined Patent Application Publication No. 2000-101909, an average luminance is detected and a flicker correction gain is calculated for each of the divided regions, so that the load of processing for determining correction gains is large. Furthermore, according to the techniques described in Japanese Unexamined Patent Application Publication No. 2000-101909, boundaries for dividing the screen are specified by a user, or automatically determined on the basis of a result of detection of a flicker region. Since the divided regions are rectangular regions defined by vertical and horizontal positions, when the flicker region has a non-rectangular complex shape, it is not possible to execute flicker correction appropriately. Although it is possible to a certain extent to deal with a flicker region with a complex shape by increasing the number of divided regions even if the divided regions are rectangular, the load of processing for determining correction gains increases.

It is desired that flicker in an image region corresponding to pixel data in a selected range can be corrected appropriately while reducing the load of processing for determining correction gains.

According to an embodiment of the present invention, there is provided an image-data processing apparatus that sequentially executes flicker correction on each frame of image data as a correction target frame, the image data being acquired through imaging by an imaging device. The image-data processing apparatus includes a threshold generator configured to generate a threshold for pixel data; an integrator configured to extract pixel data of a selected range in each frame of the image data on the basis of the threshold generated by the threshold generator, the pixel data in the selected range having either values greater than or equal to the threshold or values less than or equal to the threshold, and to integrate values of the extracted pixel data; a storage unit configured to store integrated values of a plurality of frames, the integrated values being obtained by the integrator; an average calculator configured to calculate an average value of the image data on the basis of the integrated values of the plurality of frames, the integrated values being stored in the storage unit; a gain calculator configured to divide the average value calculated by the average calculator by an integrated value associated with the correction target frame among the integrated values of the plurality of frames, the integrated values being stored in the storage unit, thereby calculating a reference correction gain for the correction target frame; a comparator configured to check whether individual pieces of pixel data in the correction target frame are pixel data in the selected range on the basis of the threshold generated by the threshold generator; a correction-gain output unit configured to output a correction gain based on the reference correction gain calculated by the gain calculator, on the basis of a result of checking by the comparator, in association with each of the pieces of pixel data in the selected range of the correction target frame; and a corrector configured to correct each of the pieces of pixel data in the selected range among the pieces of pixel data in the correction target frame on the basis of the correction gain output from the correction-gain output unit.

In the image-data processing apparatus, the threshold generator generates a threshold for pixel data. Furthermore, the integrator integrates pixel data of each frame. At this time, regarding each frame, pixel data having values greater than or equal to the threshold or pixel data having values less than or equal to the threshold is extracted and integrated as pixel data in a selected range.

The storage unit stores integrated values of a plurality of frames, obtained by the integrator. The phase relationship between the timing of imaging by the imaging device and flicker is periodical. For example, the integrated values of the plurality of frames, stored in the storage unit, are integrated values of a predetermined number of successive frames included in one period of the phase relationship between the timing of imaging by the imaging device and the flicker. Obviously, among the predetermined number of successive frames, the phase relationship between the timing of imaging by the imaging device and the flicker varies. In this case, only integrated values of frames used to calculate an average value of image data are stored in the storage unit. Thus, the capacity of the storage medium forming the storage unit can be saved.

The average calculator calculates an average value of image data on the basis of the integrated values of the plurality of frames, stored in the storage unit. At this time, for example, the average value of image data is calculated by averaging the integrated values of the predetermined number of frames included in one period of the phase relationship between the timing of imaging by the imaging device and the flicker.

The gain calculator divides the average value calculated by the average calculator by an integrated value associated with the correction target frame among the integrated values of the plurality of frames, stored in the storage unit, thereby calculating a reference correction gain for the correction target frame. As described earlier, since the phase relationship between the timing of imaging by the imaging device and the flicker is periodical. Thus, as the integrated value associated with the correction target frame, for example, it is possible to use an integrated value of a frame having the same phase relationship between the timing of imaging by the imaging device and the flicker and preceding the correction target frame. In this case, it is possible to allocate a longer time for the calculation.

The comparator checks whether individual pieces of pixel data in the correction target frame are pixel data in the selected range on the basis of the threshold generated by the threshold generator. The correction-gain output unit outputs a correction gain based on the reference correction gain calculated by the gain calculator, on the basis of a result of checking by the comparator, in association with each of the pieces of pixel data in the selected range of the correction target frame. The corrector corrects each of the pieces of pixel data in the selected range among the pieces of pixel data in the correction target frame on the basis of the correction gain output from the correction-gain output unit. By correcting the values of the pixel data in the selected range of the correction target frame, flicker that has occurred in an image region corresponding to the pixel data in the selected range is corrected.

In the flicker correction described above, it suffices to determine only one reference correction gain for each frame of the image data, so that the load of processing for determining correction gains can be reduced. Furthermore, in the flicker correction, a reference correction gain is determined using pixel data in a selected range, and the pixel data in the selected range is corrected on the basis of the reference correction gain. Thus, without affecting pixel data not in the selected range, it is possible to appropriately correct flicker that occurs in an image region corresponding to the pixel data in the selected range (an image region in which flicker correction is to be executed).

For example, regarding pixel data having a value in a range from the threshold to the average value among the pixel data in the selected range, the correction-gain output unit outputs a correction gain in a range from 1.0 to the reference correction gain in accordance with a difference between the value of the pixel data and the threshold. In this case, as the value of the pixel data becomes closer to the threshold, the value of the correction gain becomes closer to 1.0, so that the effect of correction becomes weaker. Thus, it is possible to prevent occurrence of an unnatural appearance at a boundary between the image region in which flicker correction has been executed (the image region corresponding to the pixel data in the selected range) and the other image region.

For example, the image-data processing apparatus may include a user operation unit configured to allow a user to adjust a value of the threshold generated by the threshold generator. In this case, by adjusting the value of the threshold via the user operation unit, the user can adjust as desired the image region in which flicker correction is to be executed.

As another example, the image-data processing apparatus may include a user operation unit configured to allow a user to select either pixel data having values greater than or equal to the threshold or pixel data having values less than or equal to the threshold as pixel data in the selected range. In this case, by selecting via the user operation unit either pixel data having values greater than or equal to the threshold or pixel data having values less than or equal to the threshold, the user can select either an image region corresponding to pixel data having values greater than or equal to the threshold or an image region corresponding to pixel data having values less than or equal to the threshold as desired as an image region in which flicker correction is to be executed.

According to this embodiment of the present invention, a correction gain for each frame is calculated on the basis of an integrated value of the frame, obtained by integrating pixel data in a selected range having either values greater than or equal to a threshold or values less than or equal to the threshold, and the values of the pixel data in the selected range of the frame are corrected on the basis of the correction gain, so that the load of processing for determining the correction gain can be reduced, and so that flicker in an image region corresponding to the pixel data in the selected range (an image region where flicker correction is to be executed) can be corrected appropriately.

DESCRIPTION OF THE PREFERRED EMBODIMENTS

Figure 1:
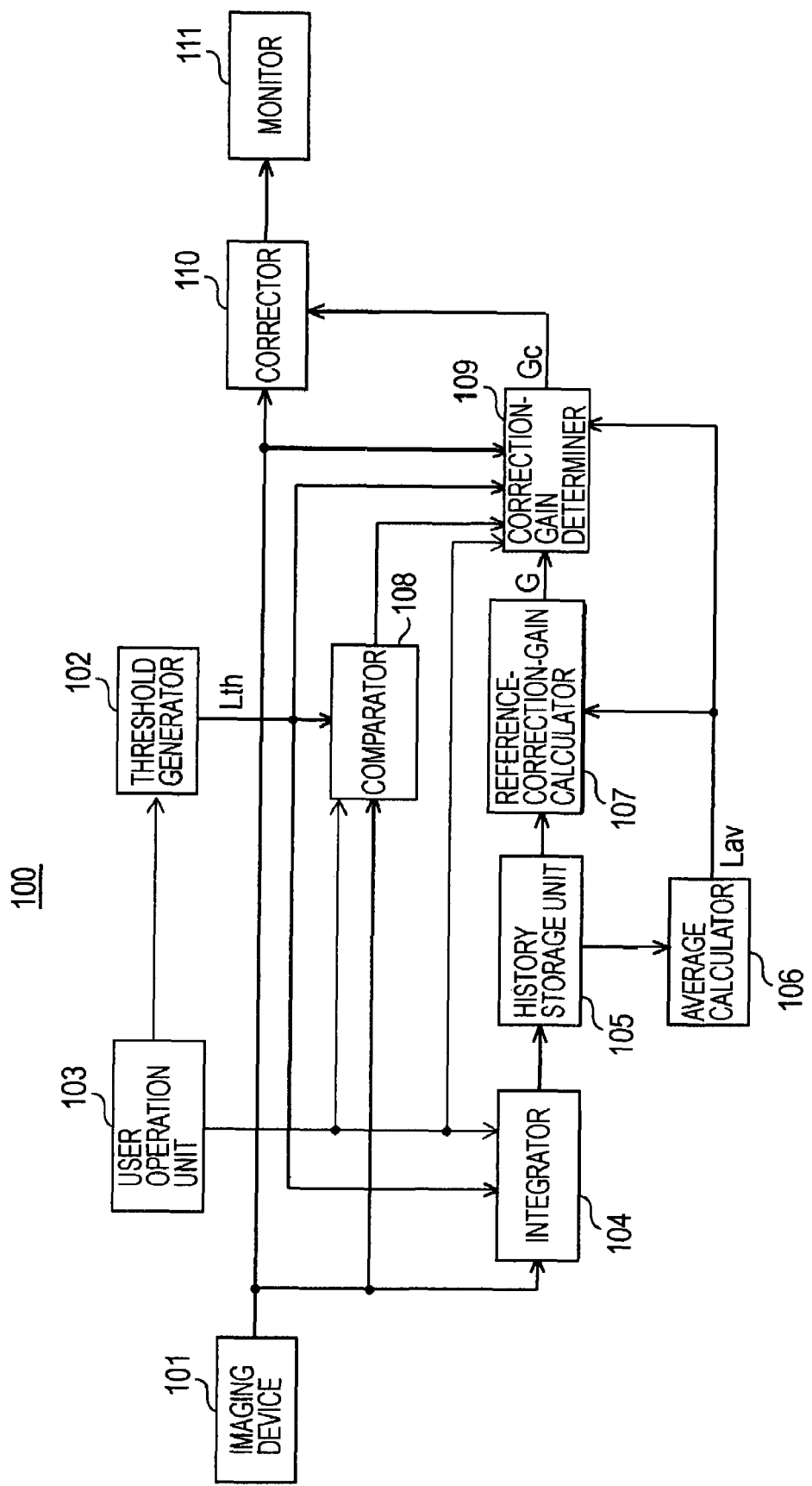
FIG. 1 is a block diagram showing the configuration of an imaging system according to an embodiment of the present invention.

Now, an embodiment of the present invention will be described with reference to the drawings. FIG. 1 shows the configuration of an imaging system 100 according to the embodiment of the present invention. The imaging system 100 includes an imaging device 101, a threshold generator 102, a user operation unit 103, an integrator 104, a history storage unit 105, an average calculator 106, a reference-correction-gain calculator 107, a comparator 108, a correction-gain determiner 109, a corrector 110, and a monitor 111. The threshold generator 102, the user operation unit 103, the integrator 104, the history storage unit 105, the average calculator 106, the reference-correction-gain calculator 107, the comparator 108, the correction-gain determiner 109, and the corrector 110 constitute an image-data processing apparatus that executes flicker correction on image data output from the imaging device 101.

The imaging device 101 captures an image of an object (not shown) and outputs image data corresponding to the object. The image data is composed of successive frames of image data. The imaging device 101 can execute high-speed imaging, for example, by reducing the frame period. In this case, what is called frame flicker occurs when the frame period becomes shorter than the ON/OFF period of illumination.

The threshold generator 102 generates a threshold Lth of pixel data. The value of the threshold Lth can be adjusted by an operation of the user operation unit 103 by a user. The user can adjust an image region in which flicker correction is to be executed by adjusting the threshold Lth. As will be described later, the image region in which flicker correction is to be executed is a region corresponding to pixel data having values greater than or equal to the threshold Lth or a region corresponding to pixel data having values less than or equal to the threshold Lth. It is possible to select either an image region corresponding to pixel data having values greater than or equal to the threshold Lth (hereinafter referred to as a "high-luminance region") or an image region corresponding to pixel data having values less than or equal to the threshold Lth (hereinafter referred to as a "low-luminance region") as an image region in which flicker correction is to be executed, as desired, by a user's operation of the user operation unit 103.

The reason that the user is allowed to select either a high-luminance region or a low-luminance region as an image region in which flicker correction is to be executed is that flicker can occur both in a high-luminance region and a low-luminance region. When flicker occurs in a high-luminance region, the user selects the high-luminance region as an image region in which flicker correction is to be executed. On the other hand, when flicker occurs in a low-luminance region, the user selects the low-luminance region as an image region in which flicker correction is to be executed.

The integrator 104 obtains an integrated value of each frame of image data output from the imaging device 101. More specifically, the integrator 104 extracts pixel data of a selected range (either pixel data having values greater than or equal to the threshold Lth or pixel data having values less than or equal to the threshold Lth) in each frame on the basis of the threshold Lth generated by the threshold generator 102, and integrates the values (levels) of the extracted pixel data to obtain an integrated value. As described earlier, when a high-luminance region is selected as an image region in which flicker correction is to be executed by an operation of the user operation unit 103 by the user, pixel data in the selected range has values greater than or equal to the threshold Lth. On the other hand, when a low-luminance region is selected as an image region in which flicker correction is to be executed by an operation of the user operation unit 103 by the user, pixel data in the selected range has values less than or equal to the threshold Lth.

In this embodiment, in order to facilitate calculation of an average value of image data in the average calculator 106 described later, in the integrator 104, the integrated value of extracted pixel data in each frame is divided by the number of pieces of the extracted pixel data (i.e., an average value of the values of the individual pieces of pixel data in the selected range is calculated). In this sense, the integrator 104 may be a pixel-data average calculator that calculates an average of the values of pixel data in a selected range for each frame of image data output from the imaging device 101.

The history storage unit 105 stores, for example, integrated values of a number of latest frames among the integrated values of individual frames, obtained by the integrator 104. The integrated values of a plurality of frames, stored in the history storage unit 105, are sequentially updated as frames proceed. The history storage unit 105 is implemented by a storage medium such as a semiconductor memory. The phase relationship between the timing of imaging by the imaging device 101 and flicker due to ON/OFF of illumination is periodical. That is, the timing of imaging and the flicker exhibit the same phase relationship at a cycle of a predetermined number of frames (the number is determined uniquely according to the frame period of imaging and the ON/OFF period of illumination).

For example, the integrated values of a plurality of frames, stored in the history storage unit 105, are integrated values of a predetermined number of successive frames (the number is determined uniquely according to the frame period of imaging and the ON/OFF period of illumination) included in one period of the phase relationship between the timing of imaging by the imaging device 101 and the flicker. Obviously, among the predetermined number of successive frames, the phase relationship between the timing of imaging by the imaging device 101 and the flicker varies. In this case, only integrated values of frames used to calculate an average value of image data are stored in the history storage unit 105. Thus, the capacity of the storage medium forming the history storage unit 105 can be saved.

The average calculator 106 calculates an average Lav of image data on the basis of the integrated values of the plurality of frames, stored in the history storage unit 105. In this case, for example, integrated values of the predetermined number of frames included in one period of the phase relationship between the timing of imaging by the imaging device 101 and the flicker are averaged to calculate the average Lav of image data.

The reference-correction-gain calculator 107 divides the average Lav of image data, calculated by the average calculator 106, by an integrated value associated with a correction target frame that is to be corrected by the corrector 110 as described later among the integrated values of the plurality of frames stored in the history storage unit 105, thereby calculating a reference correction gain G for the correction target frame. Obviously, it is possible to use an integrated value of the correction target frame itself as the integrated value associated with the correction target frame. In this embodiment, however, since the phase relationship between the timing of imaging by the imaging device 101 and the flicker is periodical as described earlier, as the integrated value associated with the correction target frame, for example, it is possible to use an integrated value of a frame having the same phase relationship between the timing of imaging by the imaging device 101 and the flicker as the correction target frame and preceding the correction target frame. In this case, since the integrated value of the frame preceding the correction target frame is used, a certain time is available before the correction target frame is actually corrected. Thus, it is possible to allocate a longer time for calculation of a reference correction gain.

On the basis of the threshold Lth generated by the threshold generator 102, the comparator 108 checks whether each piece of pixel data of the correction target frame is a piece of pixel data in the selected range (either pixel data having a value greater than or equal to the threshold Lth or pixel data having a value less than or equal to the threshold Lth). As described earlier, when a high-luminance region is selected by an operation of the user operation unit 103 by the user as an image region in which flicker correction is to be executed, the comparator 108 checks whether each, piece of pixel data has a value greater than or equal to the threshold Lth. On the other hand, when a low-luminance region is selected by an operation of the user operation unit 103 by the user as an image region in which flicker correction is to be executed, the comparator 108 checks whether each piece of pixel data has a value less than or equal to the threshold Lth.

On the basis of the result of checking by the comparator 108, the correction-gain determiner 109 outputs a correction gain Gc based on the reference correction gain G calculated by the reference-correction-gain calculator 107 in relation to the pixel data in the selected range of the correction target frame. The correction-gain determiner 109 functions as a correction-gain output unit.

In the correction-gain determiner 109, on the basis of the threshold Lth generated by the threshold generator 102, the average Lav calculated by the average calculator 106, the values (levels) Lin of the pixel data of the correction target frame, etc. as well as the result of checking by the comparator 108, a correction gain Gc that is to be output in association with each piece of pixel data of the correction target frame is determined according to the value Lin of the pixel data as follows.

Figure 2:
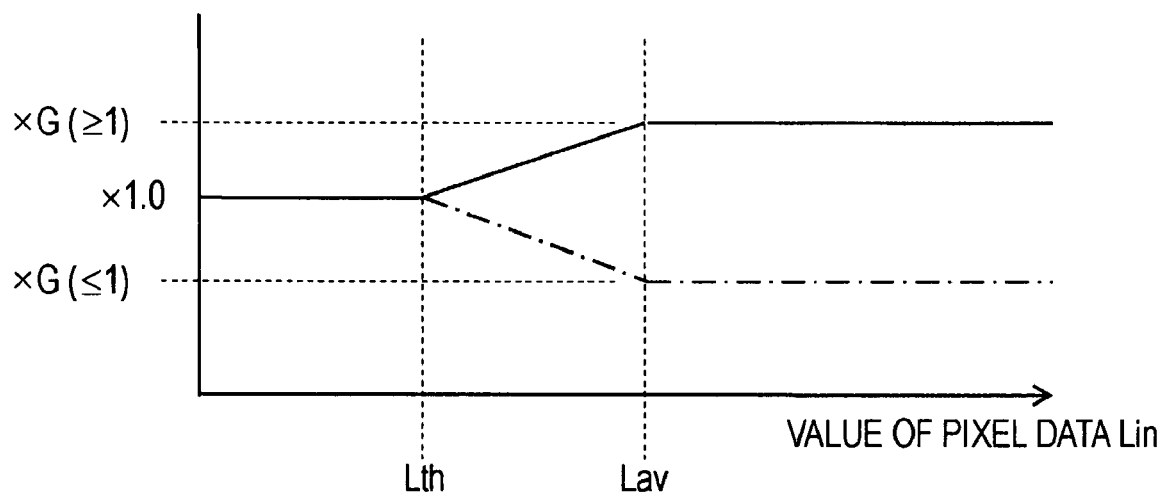
FIG. 2 is a diagram for explaining a correction gain in a case where flicker correction is executed in a high-luminance region.

First, a case where a high-luminance region is selected by an operation by the user as an image region in which flicker correction is to be executed as described earlier will be described with reference to FIG. 2. In FIG. 2, the solid line represents a case where the reference correction gain G is greater than or equal to 1.0, and the dotted-chain line represents a case where the reference correction gain G is less than or equal to 1.0.

When the value Lin of pixel data is less than or equal to the threshold Lth, it is determined that the pixel data is not pixel data included in the image region in which correction is to be executed. Thus, the correction gain Gc is chosen to be 1.0, so that correction is substantially not executed on the pixel data.

When the value Lin of pixel data is greater than the threshold Lth and less than the average Lav, the correction gain Gc is chosen to be (G−1.0)/(Lav−Lth)*(Lin−Lth)+1.0. That is, in this case, the correction gain Gc varies in a range of 1.0 to the reference correction gain G in accordance with the difference between the value Lin of the pixel data and the threshold Lth. In this case, as the value Lin of the pixel data becomes closer to the threshold Lth, the value of the correction gain Gc becomes closer to 1.0, so that the effect of correction becomes weaker. Thus, it is possible to prevent occurrence of an unnatural appearance at a boundary between the image region in which flicker correction has been executed (the image region corresponding to pixel data having values greater than or equal to the threshold Lth) and the other image region.

When the value Lin of pixel data is greater than or equal to the average Lav, the correction gain Gc is chosen to be the reference correction gain G.

Figure 3:
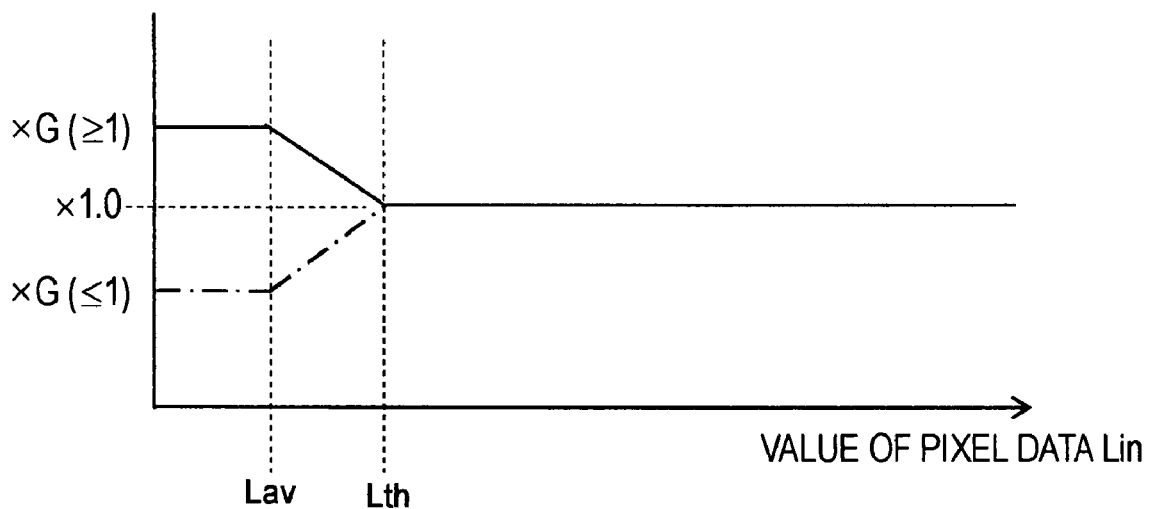
FIG. 3 is a diagram for explaining a correction gain in a case where flicker correction is executed in a low-luminance region.

Next, a case where a low-luminance region is selected by an operation by the user as an image region in which flicker correction is to be executed will be described with reference to FIG. 3. In FIG. 3, the solid line represents a case where the reference correction gain G is greater than or equal to 1.0, and the dotted-chain line represents a case where the reference correction gain G is less than or equal to 1.0.

When the value Lin of pixel data is greater than or equal to the threshold Lth, it is determined that the pixel data is not pixel data included in the image region in which correction is to be executed. Thus, the correction gain Gc is chosen to be 1.0, so that correction is substantially not executed on the pixel data.

When the value Lin of pixel data is less than the threshold Lth and greater than the average Lav, the correction gain Gc is chosen to be (1.0−G)/(Lth−Lav)*(Lth−Lin)+1.0. That is, in this case, the correction gain Gc varies in a range of 1.0 to the reference correction gain G in accordance with the difference between the value Lin of the pixel data and the threshold Lth. In this case, as the value Lin of the pixel data becomes closer to the threshold Lth, the value of the correction gain Gc becomes closer to 1.0, so that the effect of correction becomes weaker. Thus, it is possible to prevent occurrence of an unnatural appearance at a boundary between the image region in which flicker correction has been executed (the image region corresponding to pixel data having values less than or equal to the threshold Lth) and the other image region.

When the value Lin of pixel data is less than or equal to the average Lav, the correction gain Gc is chosen to be the reference correction gain G.

The corrector 110 corrects the pixel data in the selected range described earlier among the pixel data of the correction target frame, on the basis of the correction gains Gc output from the correction-gain determiner 109. In this case, the corrector 110 executes correction by multiplying each piece of pixel data of the correction target frame by the correction gain Gc output from the correction-gain determiner 109. As described earlier, the correction gain Gc of pixel data not included in the image region in which correction is to be executed is 1.0, so that correction is substantially not executed on the pixel data.

The monitor 111 displays an image based on the image data obtained through the flicker correction and output from the corrector 110. In this case, for example, by extending the frame period for displaying an image based on image data obtained by high-speed imaging by the imaging device 101, it is possible to display the image in slow motion. Although not shown, a recording device may be provided between the corrector 110 and the monitor 111 so that the image data obtained through the flicker correction by the corrector 110 is temporarily recorded by the recording device and then played back and supplied to the monitor 111. In this case, the frame period can be converted at the recording device so that the image can be displayed in slow motion as described above.

Now, an operation of the imaging system 100 shown in FIG. 1 will be described.

The threshold generator 102 generates the threshold Lth for pixel data. The threshold Lth is supplied to components where the threshold Lth is used, such as the integrator 104, the comparator 108, and the correction-gain determiner 109.

Image data obtained through imaging by the imaging device 101 is supplied to components where the image data is used, such as the integrator 104, the comparator 108, the correction-gain determiner 109, and the corrector 110. The corrector 110 executes flicker correction sequentially on the frames of the image data as correction target frames.

The integrator 104 extracts pixel data in a selected range (pixel data having either values greater than or equal to the threshold Lth or values less than or equal to the threshold Lth) from each frame of the image data, and integrates the values to obtain an integrated value. The integrated value is supplied to the history storage unit 105. The history storage unit 105 stores the integrated values of a plurality of latest frames among the integrated values of the frames obtained by the integrator 104. For example, the history storage unit 105 stores integrated values of a predetermined number of successive frames (the number is determined uniquely according to the frame period of imaging and the ON/OFF period of illumination) included in one period of the phase relationship between the timing of imaging by the imaging device 101 and the flicker.

On the basis of the integrated values of the plurality of frames, stored in the history storage unit 105, the average calculator 106 calculates an average Lav of the image data. For example, the average Lav is calculated by averaging the predetermined number of successive frames included in one period of the phase relationship between the timing of imaging by the imaging device 101 and the flicker. The average Lav is supplied to the reference-correction-gain calculator 107 and the correction-gain determiner 109.

As described earlier, the corrector 110 executes flicker correction sequentially on the frames of the image data as correction target frames. The reference-correction-gain calculator 107 sequentially calculates reference correction gains G associated with the individual correction target frames. In this case, a reference correction gain G associated with a correction target frame that is to be corrected by the corrector 110 is calculated by dividing the average Lav of the image data, calculated by the average calculator 106, by the integrated value associated with the correction target frame among the integrated values of the plurality of frames, stored in the history storage, unit 105. The reference correction gains G are supplied to the correction-gain determiner 109.

The comparator 108 checks on the basis of the threshold Lth whether each piece of pixel data in the correction target frame is pixel data in the selected range (either pixel data having a value greater than or equal to the threshold Lth or pixel data having a value less than or equal to the threshold Lth). Since pixel data in the selected range corresponds to an image region in which flicker correction is to be executed, checking as to whether the pixel data is in the selected range is equivalent to checking whether the pixel data is to be corrected. The result of checking by the comparator 108 is supplied to the correction-gain determiner 109.

In relation to each piece of pixel data in the selected range of the correction target frame, the correction-gain determiner 109 outputs a correction gain Gc based on the reference correction gain G. In this case, of the pixel data in the selected range, regarding pixel data having values in a range of the threshold Lth to the average Lav, the correction gain Gc that is output takes on a value in a range of 1.0 to the reference correction gain G in accordance with the difference between the value Lin of the pixel data and the threshold Lth. The correction gains Gc are supplied to the corrector 110.

Among the pixel data in the correction target frames, the corrector 110 corrects the pixel data in the selected range on the basis of the correction gains Gc output from the correction-gain determiner 109. Since the correction gain Gc for pixel data not in the selected range is chosen to be 1.0, correction is substantially not executed.

The image data obtained through the flicker correction by the corrector 110 is supplied to the monitor 111. The monitor 111 displays an image based on the image data obtained through the flicker correction. In the image displayed on the monitor 111, the flicker is corrected appropriately in the image region where the flicker correction has been executed (the image region corresponding to the pixel data in the selected range).

When the value of the threshold Lth generated by the threshold generator 102 is adjusted by an operation by the user, the number of pieces of pixel data included in the selected range decreases or increases, so that the image region where flicker correction is to be executed changes accordingly. The user can adjust the value of the threshold Lth to an optimal value with reference to the image displayed on the monitor 111.

Furthermore, when a high-luminance region (an image region corresponding to pixel data having values greater than or equal to the threshold Lth) is selected by an operation by the user as an image region in which flicker correction is to be executed, the reference-correction-gain calculator 107 calculates a reference correction gain G on the basis of the pixel data corresponding to the high-luminance region, and the corrector 110 executes flicker correction on the pixel data corresponding to the high-luminance region on the basis of the correction gains Gc. On the other hand, when a low-luminance region (an image region corresponding to pixel data having values less than or equal to the threshold Lth) is selected by an operation by the user as an image region in which flicker correction is to be executed, the reference-correction-gain calculator 107 calculates a reference correction gain G on the basis of the pixel data corresponding to the low-luminance region, and the corrector 110 executes flicker correction on the pixel data corresponding to the low-luminance region on the basis of the correction gains Gc. With reference to the image displayed on the monitor 111, the user can select either a high-luminance region or a low-luminance region as an image region in which flicker correction is to be executed.

Next, flicker correction executed in the imaging system 100 shown in FIG. 1 will be described further in the context of a specific example.

In the following description, as an example, a case where flicker correction is executed on a correction target frame FL shown in FIG. 4 will be considered. It is assumed that, in the correction target frame FL, flicker has occurred by illumination in a field region, but flicker has not occurred in a rear dark region due to difference in illuminating conditions. FIG. 5 shows a presumable distribution of the values (levels) Lin of the pieces of pixel data. The values Lin of pixel data in the field region are distributed in "Level B", and the values Lin of pixel data in the rear dark region is distributed in "Level A".

As described earlier, the image data obtained through imaging by the imaging device 101 is integrated by the integrator 104 on a frame-by-frame basis. At this time, the value of the threshold Lth generated by the threshold generator 102 is set in consideration of the values (levels) Lin of pixel data in the region where flicker has occurred. When the values (levels) Lin of the pieces of pixel data in the correction target frame FL is distributed as shown in FIG. 5, the value of the threshold Lth is set between Level B and Level A as shown in FIG. 5.

As described earlier, the user can adjust the value of the threshold Lth by an operation of the user operation unit 103. More specifically, the user can adjust the value of the threshold Lth with reference to an image displayed on the monitor 111 so that the flicker in the field region is corrected while the rear dark region will not be affected by the flicker correction. When the value of the threshold Lth is adjusted as described above, the user can set the value of the threshold Lth between Level B and Level A as shown in FIG. 5 without particularly intending to do so.

In the correction target frame FL, since flicker has occurred in a bright field, a high-luminance region is selected by an operation by the user as an image region in which flicker correction is to be executed. Thus, the integrator 104 extracts pixel data having values greater than or equal to the threshold Lth as a selected range, i.e., extracts pixel data included in the portion of Level B while excluding pixel data included in the portion of Level A, and integrates the values of the extracted pixel data.

Figure 6:
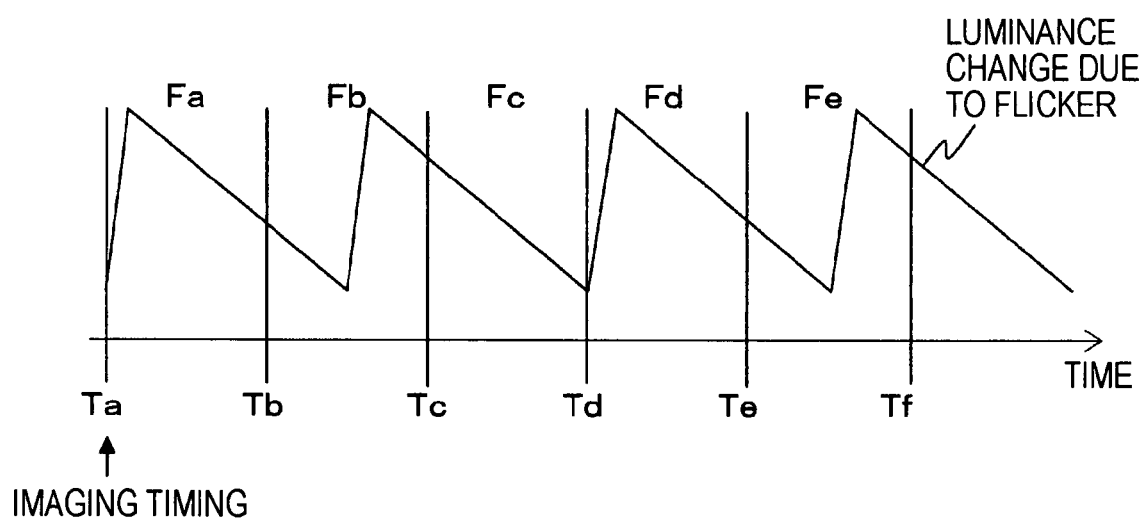
FIG. 6 is a diagram showing an example of phase relationship between timing of imaging and flicker.

The phase relationship between the timing of imaging by the imaging device 101 and flicker due to ON/OFF of illumination is periodical. That is, the timing of imaging and the flicker exhibit the same phase relationship at a cycle of a predetermined period. The period of the phase relationship between the timing of imaging and the flicker is determined uniquely according to the frame period of imaging and the ON/OFF period of illumination. For example, when the timing of imaging and the flicker has a phase relationship shown in FIG. 6, the phase relationship between the timing of imaging and the flicker coincides between an imaging timing Ta and an imaging timing Td. In FIG. 6, frames Fa, Fb, Fc, . . . are frames corresponding to imaging timings Ta, Tb, Tc, . . . .

Figure 7:
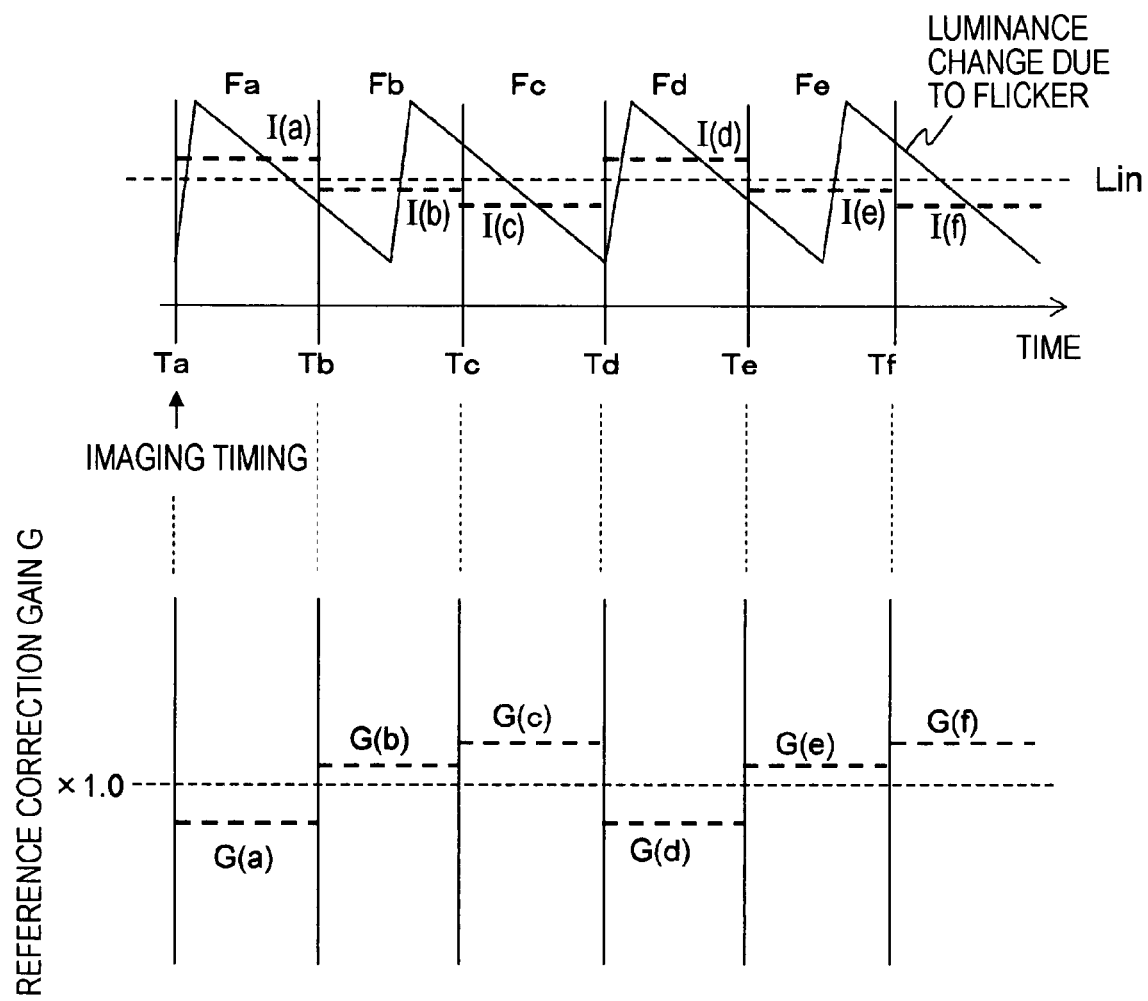
FIG. 7 is a diagram showing integrated values of individual frames of image data and corresponding change in reference correction gain.
Figure 8:
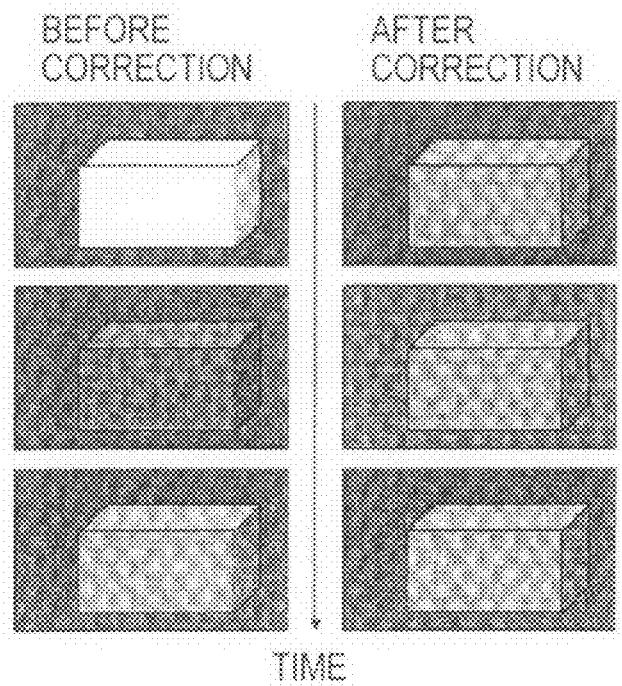
FIG. 8 is a diagram for explaining a first example of a problem of existing flicker correction techniques.
Figure 9:
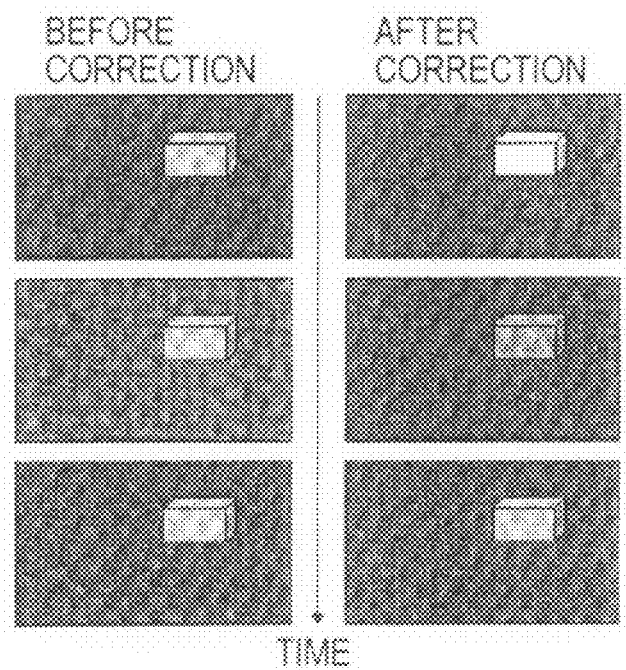
FIG. 9 is a diagram for explaining a second example of a problem of existing flicker correction techniques.

In this example, as integrated values of a predetermined number of successive frames included in one period of the phase relationship between the timing of imaging by the imaging device 101 and the flicker, the history storage unit 105 stores integrated values (average values of the values of pieces of pixel data in the selected range) I(a), I(b), and I(c) of the frames Fa, Fb, and Fc. In FIG. 7, the integrated values I(a), I(b), I(c), . . . of the frames corresponding to the imaging timings Ta, Tb, Tc, . . . are shown.

The average calculator 106 calculates an average value Lav of the image data by calculating an average of the integrated value of the frame corresponding to the imaging timings Ta, Tb, and Tc, stored in the history storage unit 105 as described above.

The reference-correction-gain calculator 107 calculates a reference correction gain G on the basis of the average Lav calculated by the average calculator 106 and the integrated value of a frame preceding a frame that is to be corrected next (a correction target frame) by one period. In the case of this example, when the frame Fd corresponding to the imaging timing Td is to be corrected, the frame preceding the frame Fd by one period is the frame Fa corresponding to the imaging timing Ta. Thus, a reference correction gain G(d) for the frame Fd is calculated by dividing the average Lav by the integrated value I(a) of the frame Fa.

Furthermore, FIG. 7 shows reference correction gains G(a), G(b), G(c), . . . for the frames Fa, Fb, Fc, . . . , calculated in similar manners.

The reference correction gain G calculated by the reference-correction-gain calculator 107 is based on the pixel data used in the integrator 104 and the average calculator 106, not including the pixel data that is not in the selected range on the basis of the threshold Lth (pixel data having values less than the threshold Lth). Thus, if all the pixel data in the correction target frame is corrected using the reference correction gain G, since the reference correction gain G is not suitable for the excluded pixel data not in the selected range, flicker components are amplified instead of being reduced in an image region corresponding to the pixel data not in the selected range.

In order to avoid such an effect on the pixel data not in the selected range, the correction gain Gc for the pixel data not in the selected range is chosen to be 1.0, so that correction is substantially not executed. The comparator 108 checks on the basis of the threshold Lth whether each piece of pixel data in the correction target frame is pixel data in the selected range (pixel data having a value greater than or equal to the threshold Lth) or pixel data not in the selected range (pixel data having a value less than the threshold Lth).

On the basis of the result of checking by the comparator 108 and so forth, the correction-gain determiner 109 determines a correction gain Gc for each piece of pixel data in the correction target frame on the basis of the value Lin of the piece of pixel data (refer to FIG. 2). At this time, as described above, the correction gain Gc for pixel data not in the selected range is chosen to be 1.0, so that flicker components will not be amplified instead of being reduced in an image region corresponding to the pixel data not in the selected range.

When the value Lin of pixel data is greater than the threshold Lth and less than the average Lav, the correction gain Gc is chosen to be closer to 1.0 as the value Lin of the pixel data becomes closer to the threshold Lth, so that the effect of correction is alleviated. Thus, unnaturalness at a boundary between the image region in which flicker correction has been executed (the image region corresponding to pixel data having values greater than or equal to the threshold Lth) and the other image region is alleviated.

The corrector 110 multiplies the correction gains Gc for the individual pieces of pixel data in the correction target frame, determined by the correction-gain determiner 109, by the associated pixels of pixel data. The corrector 110 outputs image data obtained through flicker correction, i.e., image data in which flicker correction has been executed on pixel data in the selected range of each correction target frame.

Figure 4:
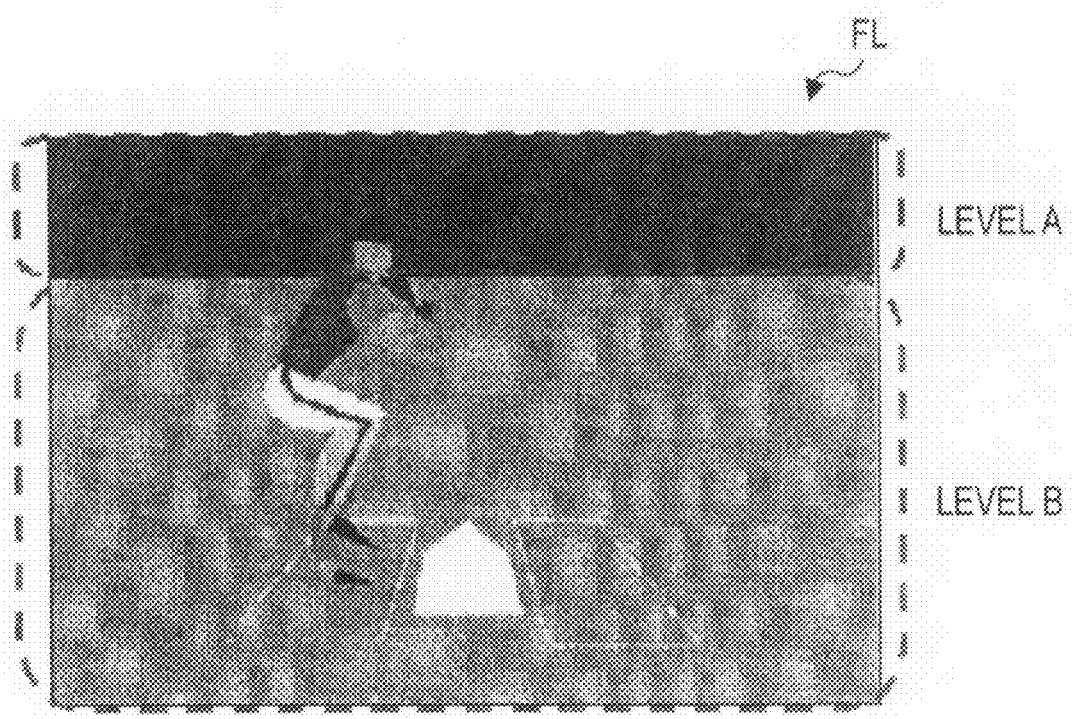
FIG. 4 is a diagram showing an example of a correction target frame (in which flicker has occurred in a field region but flicker has not occurred in a rear dark region)
Figure 5:
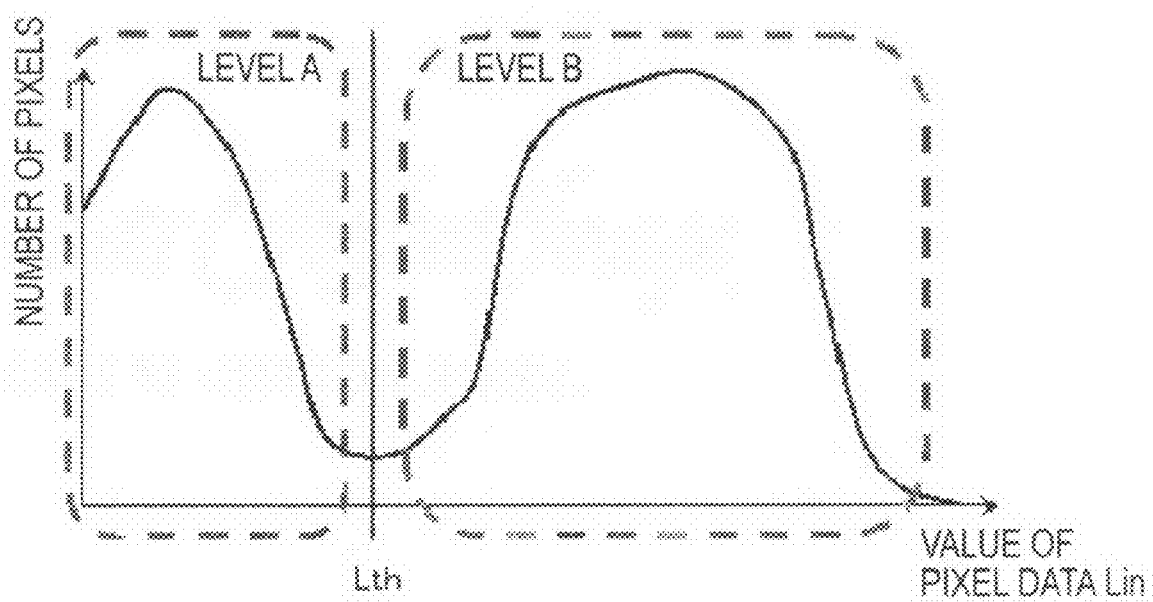
FIG. 5 is a diagram showing a distribution of values (levels) of individual pieces of pixel data in a correction target frame.

In the case of the correction target frame shown in FIG. 4, flicker is reduced in the field region, where flicker has occurred, and the rear dark region, where flicker has not occurred, is not affected by the flicker correction and is displayed without change.

In the imaging system 100 shown in FIG. 1, it suffices to determine only one reference correction gain G for each frame of image data, so that the load of processing for determining correction gains Gc can be reduced.

Furthermore, in the imaging system 100 shown in FIG. 1, a reference correction gain G is determined using pixel data in a selected range, and the pixel data in the selected range is corrected on the basis of the reference correction gain G. Thus, without affecting pixel data not in the selected range, it is possible to appropriately correct flicker that occurs in an image region corresponding to the pixel data in the selected range (an image region in which flicker correction is to be executed).

Furthermore, in the imaging system 100 shown in FIG. 1, a user can adjust the value of the threshold Lth generated by the threshold generator 102, so that the image region in which flicker correction is to be executed can be adjusted as desired.

Furthermore, in the imaging system 100 shown in FIG. 1, the user can select either a high-luminance region (an image region corresponding to pixel data having values greater than or equal to the threshold Lth) or a low-luminance region (an image region corresponding to pixel data having values less than or equal to the threshold Lth) as desired as an image region in which flicker correction is to be executed, by selecting via the user operation unit 103 either pixel data having values greater than or equal to the threshold Lth or pixel data having values less than or equal to the threshold Lth.

It should be understood by those skilled in the art that various modifications, combinations, sub-combinations and alterations may occur depending on design requirements and other factors insofar as they are within the scope of the appended claims or the equivalents thereof.

What is claimed is:

1. An image-data processing apparatus that sequentially executes flicker correction on each frame of image data as a correction target frame, the image data being acquired through imaging by an imaging device, the image-data processing apparatus comprising:
   a threshold generator configured to generate a threshold for pixel data;
   an integrator configured to extract pixel data of a selected range in each frame of the image data on the basis of the threshold generated by the threshold generator, the pixel data in the selected range having either values greater than or equal to the threshold or values less than or equal to the threshold, and to integrate values of the extracted pixel data;
   a storage unit configured to store integrated values of a plurality of frames, the integrated values being obtained by the integrator;
   an average calculator configured to calculate an average value of the image data on the basis of the integrated values of the plurality of frames, the integrated values being stored in the storage unit;
   a gain calculator configured to divide the average value calculated by the average calculator by an integrated value associated with the correction target frame among the integrated values of the plurality of frames, the integrated values being stored in the storage unit, thereby calculating a reference correction gain for the correction target frame;
   a comparator configured to check whether individual pieces of pixel data in the correction target frame are pixel data in the selected range on the basis of the threshold generated by the threshold generator;
   a correction-gain output unit configured to output a correction gain based on the reference correction gain calculated by the gain calculator, on the basis of a result of checking by the comparator, in association with each of the pieces of pixel data in the selected range of the correction target frame; and
   a corrector configured to correct each of the pieces of pixel data in the selected range among the pieces of pixel data in the correction target frame on the basis of the correction gain output from the correction-gain output unit.

2. The image-data processing apparatus according to claim 1, wherein the integrated values of the plurality of frames, stored in the storage unit, are integrated values of a predetermined number of successive frames included in one period of phase relationship between timing of imaging by the imaging device and flicker.

3. The image-data processing apparatus according to claim 1, wherein, as the integrated value associated with the correction target frame, the gain calculator uses an integrated value of a frame having the same phase relationship between the timing of imaging by the imaging device and the flicker as the correction target frame and preceding the correction target frame.

4. The image-data processing apparatus according to claim 1, wherein, regarding pixel data having a value in a range from the threshold to the average value among the pixel data in the selected range, the correction-gain output unit outputs a correction gain in a range from 1.0 to the reference correction gain in accordance with a difference between the value of the pixel data and the threshold.

5. The image-data processing apparatus according to claim 1, further comprising:
   a user operation unit configured to allow a user to adjust a value of the threshold generated by the threshold generator.

6. The image-data processing apparatus according to claim 1, further comprising:
   a user operation unit configured to allow a user to select either pixel data having values greater than or equal to the threshold or pixel data having values less than or equal to the threshold as pixel data in the selected range.

7. An image-data processing method for sequentially executing flicker correction on each frame of image data as a correction target frame, the image data being acquired through imaging by an imaging device, the image-data processing method comprising the steps of:
   generating a threshold for pixel data;
   extracting pixel data of a selected range in each frame of the image data on the basis of the threshold for pixel data, the pixel data in the selected range having either values greater than or equal to the threshold or values less than or equal to the threshold, and integrating values of the extracted pixel data;
   storing integrated values of a plurality of frames in a storage medium;
   calculating an average value of the image data on the basis of the integrated values of the plurality of frames, the integrated values being stored in the storage medium;
   dividing the average value by an integrated value associated with the correction target frame among the integrated values of the plurality of frames, the integrated values being stored in the storage medium, thereby calculating a reference correction gain for the correction target frame;
   checking whether individual pieces of pixel data in the correction target frame are pixel data in the selected range on the basis of the threshold for pixel data;
   outputting a correction gain based on the reference correction gain, on the basis of a result of checking by the comparing, in association with each of the pieces of pixel data in the selected range of the correction target frame; and
   correcting each of the pieces of pixel data in the selected range among the pieces of pixel data in the correction target frame on the basis of the output correction gain.

8. An imaging system comprising:
   an imaging device; and
   an image-data processing apparatus that sequentially executes flicker correction on each frame of image data as a correction target frame, the image data being acquired through imaging by the imaging device;
   wherein the image-data processing apparatus includes
   a threshold generator configured to generate a threshold for pixel data;
   an integrator configured to extract pixel data of a selected range in each frame of the image data on the basis of the threshold generated by the threshold generator, the pixel data in the selected range having either values greater than or equal to the threshold or values less than or equal to the threshold, and to integrate values of the extracted pixel data;

a storage unit configured to store integrated values of a plurality of frames, the integrated values being obtained by the integrator;

an average calculator configured to calculate an average value of the image data on the basis of the integrated values of the plurality of frames, the integrated values being stored in the storage unit;

a gain calculator configured to divide the average value calculated by the average calculator by an integrated value associated with the correction target frame among the integrated values of the plurality of frames, the integrated values being stored in the storage unit, thereby calculating a reference correction gain for the correction target frame;

a comparator configured to check whether individual pieces of pixel data in the correction target frame are pixel data in the selected range on the basis of the threshold generated by the threshold generator;

a correction-gain output unit configured to output a correction gain based on the reference correction gain calculated by the gain calculator, on the basis of a result of checking by the comparator, in association with each of the pieces of pixel data in the selected range of the correction target frame; and a corrector configured to correct each of the pieces of pixel data in the selected range among the pieces of pixel data in the correction target frame on the basis of the correction gain output from the correction-gain output unit.

* * * * *